United States Patent
Seeland

(10) Patent No.: US 6,206,605 B1
(45) Date of Patent: Mar. 27, 2001

(54) WOODEN PIECE OF FURNITURE

(75) Inventor: Peter Seeland, Gleichen-Bremke (DE)

(73) Assignee: Joseph Doring, Schoneback (DE)

( * ) Notice: Subject to any disclaimer, the term of this patent is extended or adjusted under 35 U.S.C. 154(b) by 0 days.

(21) Appl. No.: 09/178,174

(22) Filed: Oct. 23, 1998

(30) Foreign Application Priority Data

Oct. 24, 1997 (DE) .............................. 197 47 362

(51) Int. Cl.$^7$ ..................................... F16B 11/00
(52) U.S. Cl. ...................... 403/219; 403/170; 403/306
(58) Field of Search .................. 403/217, 218, 403/219, 180, 169, 170–171, 176, DIG. 11, DIG. 12, DIG. 13, 306; 52/656.9

(56) References Cited

U.S. PATENT DOCUMENTS

| | | | |
|---|---|---|---|
| 3,966,337 | * | 6/1976 | Crawford ............................. 403/170 |
| 3,973,854 | * | 8/1976 | Gilbo et al. ......................... 403/170 |
| 4,540,308 | * | 9/1985 | Colby .................................. 403/219 |
| 4,726,705 | * | 2/1988 | Gomes ............................. 403/407.1 |
| 5,176,462 | * | 1/1993 | Chen .................................. 403/252 |
| 5,185,982 | * | 2/1993 | Hostetler ............................. 52/646 |
| 5,271,685 | * | 12/1993 | Stark .................................. 403/171 |
| 5,832,689 | * | 11/1998 | Curll .................................. 52/656.9 |
| 5,848,852 | * | 12/1998 | Shpigel .............................. 403/219 |

FOREIGN PATENT DOCUMENTS

| | | |
|---|---|---|
| 808 741 | 7/1951 | (DE) . |
| 28 23 772 | 5/1978 | (DE) . |
| 87 11 543 U | 8/1987 | (DE) . |
| 296 04 261 U | 3/1996 | (DE) . |

* cited by examiner

Primary Examiner—Lynne H. Browne
Assistant Examiner—John B. Walsh
(74) Attorney, Agent, or Firm—Thomas, Kayden, Horstemeyer & Risley

(57) ABSTRACT

A wooden piece of furniture includes at least three rod-like elements each having shorter edges, longer edges and an end portion of a rectangular cross section with a ratio of approximately two to three. The cross section is formed by the shorter and the longer edges. Slits are located in the end portion of each of the rod-like elements. The slits are arranged in the middle between and parallel to the shorter edges. The depth of the slits corresponds to the longer edges, and the width of the slits corresponds to one third of the longer edges. Cutouts are located in the end portion of each of the rod-like elements. The cutouts are arranged parallel to the longer edges, the depth of the cutouts corresponding to the shorter edges, and the width of the cutouts corresponding to half of the shorter edges. Extending times each formed by one of the slits and one of the cutouts are located in the end portion of each of the rod-like elements. At least one corner may be formed by connecting the end portions of the three rod-like elements in a rectangular configuration. At least one common bore extends at least partially through the three rod-like elements and is positioned at a common angle with respect to the rectangular configuration of the three rod-like elements. The common bore intersects the tines of the three rod-like elements. At least one plug may be inserted into the bore to secure the rectangular configuration of the three rod-like elements.

10 Claims, 5 Drawing Sheets

WOODEN PIECE OF FURNITURE

FIELD OF THE INVENTION

The present invention generally relates to a wooden piece of furniture to be connected. More specifically, the present invention relates to a wooden piece of furniture having at least one corner of three rod-like elements to be connected to each other in rectangular configuration to form the corner.

BACKGROUND OF THE INVENTION

A wooden piece of furniture is an object which normally has a number of corners. A corner is to be understood as the place in which three rod-like elements are connected with their end portions. The rod-like elements are arranged perpendicularly to each other. Two of the three rod-like elements each are positioned in a configuration so to enclose an angle of 90°. This configuration corresponds to the three directions in a three-dimensional room. For example, corners of the mentioned type are used in connection with frames for tables, frames of beds, chairs, stools, stands, and other pieces of furniture. The corner is a certain kind of junction point. Normally, the corner is connected in fixed manner, ie. undetachable. Often, glue is used for this purpose. But the composition can be performed without glue to create a mobile piece of furniture which is easily mountable, and easily detachable, also. In this case, the three rod-like elements are connected with their end portions to penetrate each other.

A wooden piece of furniture is known from the German Gebrauchsmuster DE-GM 87 11 543. Rod-like elements are used to meet each other when forming a corner. The shape of the end portions of the three rod-like elements is important. The end portion have a length corresponding to the length in which the rod-Eke elements penetrate each other in the connected configuration. All of the three rod-like element have the same shape as far as the end portions are concerned. The cross section of the rod-like elements is rectangular having a ratio of their edges of 2:3. Thus, there are shorter edges and longer edges. Each rod-like element has a slit with a depth and a width arranged in the end portion. The slit is arranged in the middle between and parallel to the shorter edges. The depth of the slit is equal to the longer edge. The width of said slit corresponds to a third of the longer edge. Furthermore, each of the rod-like elements has a cutout with a depth and a width arranged parallel to the longer edges to form two extending times. The depth of said cutout is equal with the shorter edge. The width of the cutout is half the length of the shorter edge. The cutout is eccentrically arranged with respect to a middle plane. The cutout begins at the outer surface along the longer edge and ends in the middle plane, i.e. between the surfaces defined by the longer edges. The end portions of the rod-like elements are identically shaped. Thus, it is easy to produce such rod-like elements in series. The edges of the cross section of the rod-like elements should have the ratio of 2:3 at least in the end portion, while outside the end portion the rod-like elements may have such a ratio or a different one. A square cross section can be used outside the end portion. A circular cross section is applicable also outside the end portion. The shaping of the end portions of the rod-like elements makes it possible to connect the first two rod-like elements perpendicular to each other in a common plane. Subsequently, the third rod-like element is put into the end regions of the two connected rod-like elements. Having done this, stability appears in all of the three directions in a room system Putting is done by moving the rod-like elements in the directions of their extensions. Thus, a stable corner is formed by the three rod-like elements. This configuration holds the three rectangular angles. The configuration is easily detachable if used without glue. Using glue makes the piece of furniture fixly mounted. In addition, the connected corner offers a decorative look. A cube-Eke hollow space appears on the outside of the corner after connecting the three rod-like elements.

SUMMARY OF THE INVENTION

Briefly described, the present invention comprises a wooden piece of furniture having at least one corner. Three rod-like elements are provided having end portions of an identical rectangular cross section with a ratio of 2:3 formed by shorter edges and longer edges. The three rod-like elements are connectable in rectangular configuration to each other to form the corner. Each rod-like element has a slit with a certain depth and a certain width. The slit is arranged in the end portion. The slit is positioned in the middle between and parallel to the surfaces defined by the shorter edges. The depth of said slit is equal to the longer edge. The width of said slit corresponds to a third of the longer edge. Each rod-like element has a cutout with a certain depth and a certain width. The cutout is arranged parallel to the longer edges to form two extending tines. The depth of said cutout is equal to the shorter edge. The width of said cutout is half the length of the shorter edge. A common bore is provided in the three rod-like elements. The bore is positioned in a common angle with respect to the rectangular configuration of the three rod-like elements. The bore intersects the tines of the three rod-like elements. A plug having a shaft is to be inserted into the bore to secure said connected rectangular configuration of the three rod-like elements.

The present invention starts from the idea to provide the rod-like elements with a common bore. Preferably, the bore is drilled after composing the three rod-like elements. The bore has to be drilled in an inclined angle in a manner so to intersect each of the three rod-like elements. A plug is inserted into the bore. The diameter of the plug corresponds to the diameter of the bore. Preferably an interference fit is attained The plug cannot fall out of the bore. The plug is a kind of security element preventing the detachment of the piece of furniture as long as the plug is inserted. The plug can have the shape of a cylinder, especially made from wood, plastics or the like. If the piece of furniture has to be dismounted, the plug is removed from the bore by pulling or driving out. If the bore is a pocket hole the plug must be pulled out. Subsequently, the three rod-like elements may be detached by pulling or moving one rod-like element after the other in the direction contrary to the composing direction. If the connection is used to form a piece of furniture which is not to be detached any more, there is the possibility of inserting the plug adding glue or adhesive. The surfaces in the end regions of the rod-like elements contacting each other can be coated with glue also. It is not necessary that the bore runs completely through the corner formed by the three rod-like elements. But of course, such a bore is advantageous in handling. But it is possible also to use a pocket hole as a bore, the bore to be drilled starting from the inside or from the outside of the corner.

The plug may have a diameter corresponding to the diameter of the bore. But the plug does not have to have a cylindrical shape. Instead, it may have a conical design also widening up the bore between the rod-like elements during insertion. Thus, pre-stressing occurs stabilizing the corner.

The piece of furniture includes a hollow cube-like space of the connected rectangular configuration of the three rod-like elements. A head is arranged on the plug to fill said cube-like space. A head is a thickening compared to a shaft of the plug. The thickening or head may have different shape. Especially, the head may have a cube-like shape having the dimensions of the hollow cube-like space on the peak of the corner. In this case, the hollow space is filled with the head of the plug. The hollow space is hidden and cannot be seen any more. Thus, not only a decorative look is attained, but a security function, also.

It is also possible to design the head differently and/or to position the head on the inside of the corner. The inside of the corner normally is a place which cannot be seen from the outside of the piece of furniture. It is also possible to design the head with a diameter being greater than necessary to fill the hollow space. The head may remain untreated as a decorative element or may be grinded to be adapted to the cube-like shape of the hollow space.

The axis of the bore may be located in the (one) common angle, ie. with respect to the system of three axles suspended by the three rod-like elements. The one common angle is the angle in the middle of the three directions of a room system. If the axis of the bore flushes exactly with this angle, the bore intersects all of the tines of the rod-like elements in the same way. Placing the axis of the bore in flushing alignment with the angle is necessary to connect the same three rod-like elements in a left turning arrangement, or, alternatively, in a right turning arrangement. The axis of the common bore may differ from the one common angle. Other inclinations of the axis are possible, keeping in mind to intersect all of rod-like elements to guarantee the security function by the inserted plug. If the axis of the bore departs from the common angle the three rod-like elements can only be connected in the left turning arrangement or the right turning arrangement.

The bore should have a diameter greater than a minimum diameter. Preferably, the diameter of the bore should be 6 mm, better 8 mm or 10 mm, so that the bore sufficiently intersects large areas of the tines to improve the security function of the plug contacting these areas.

The bore may extend completely through the rod-like elements. Alternatively, the bore may be a pocket hole. If a running through bore is used, the plug may be designed with a head.

Instead, a stepped bore may be used. A stepped bore is an advantageous possibility. The portion having the smaller diameter receives the shaft of the plug, while the portion having the larger diameter corresponds to the head of the plug. A stepped bore offers the possibility to design the head of the plug larger, and to make the production of the plug easier. A head having a cylindrical shape is a decorative element.

In a further possibility, the connected rectangular configuration of the three rod-like elements can comprise a flattening forming a common plane surface of triangular shape. The common plane surface is positioned in an angle of 45°. In this configuration, the three rod-like elements have identical shape also.

The plug to be used in connection with a stepped bore may have two cylindrical portions with corresponding diameters. The cylindrical portions are designed with respect to the cube-like spaces on the inside and on the outside of the corner. Composing, connecting or jointing the three rod-like elements generates a first hollow space on the outside of the corner and a second hollow space about in the middle of the corner. The second hollow space cannot be seen in the connected configuration of the three rod-like elements.

It is an object of the present invention to provide a wooden piece of furniture having at least one corner formed by three rod-like elements in connected configuration.

Another object of the present invention is to provide a piece of furniture which is easy to assemble and easy to dismount.

Still another object of the present invention is to provide a piece of furniture having a corner having a security function.

Other features and advantages of the present invention will become apparent to one with skill in the art upon examination of the following drawings and detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views. The drawings schematically present wooden pieces of furniture according to preferred embodiments of the present invention.

DETAILED DESCRIPTION

Figure 1:
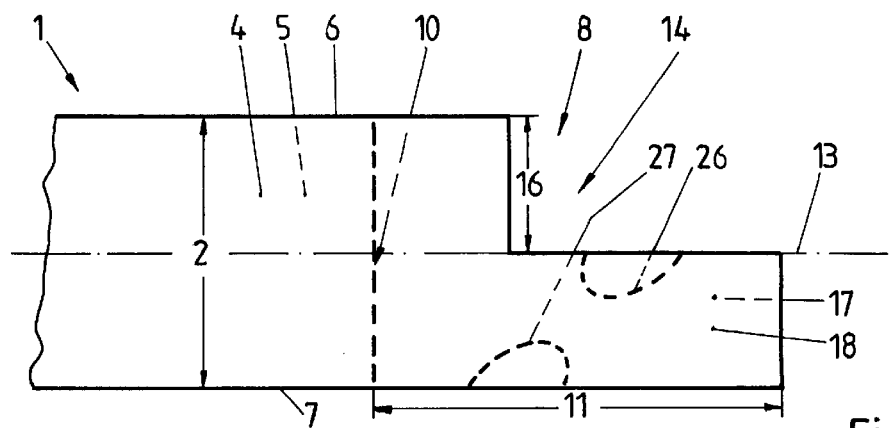
FIG. 1 is a side elevational view of a first embodiment of the invention.
Figure 2:
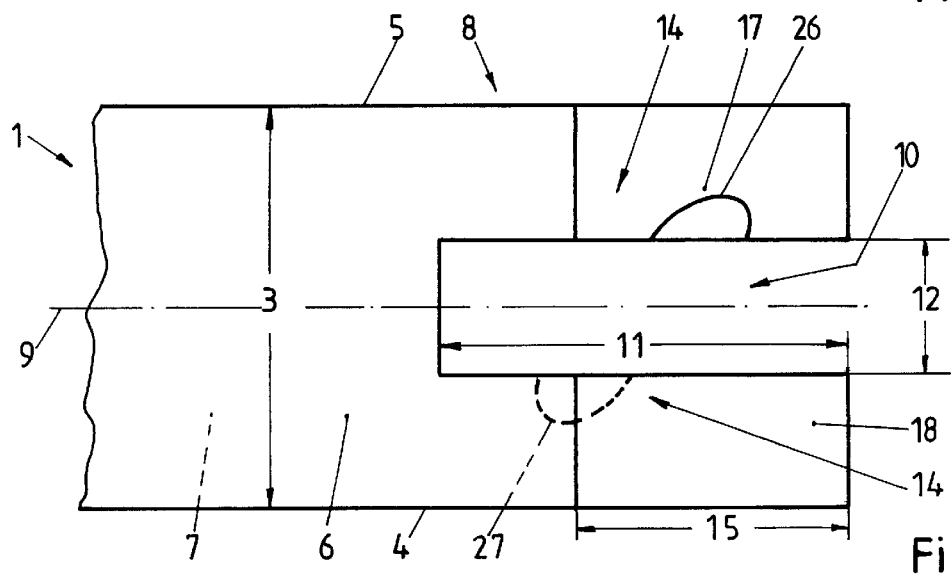
FIG. 2 is a top view of the first embodiment of the invention.
Figure 3:
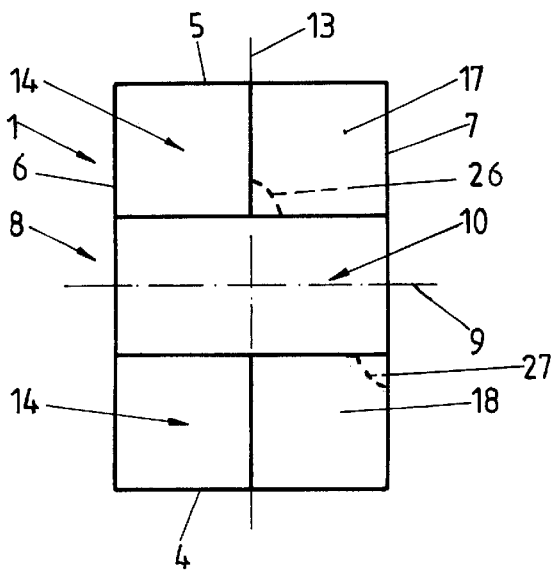
FIG. 3 is a side elevational view of the end of the first embodiment of the invention.
Figure 4:
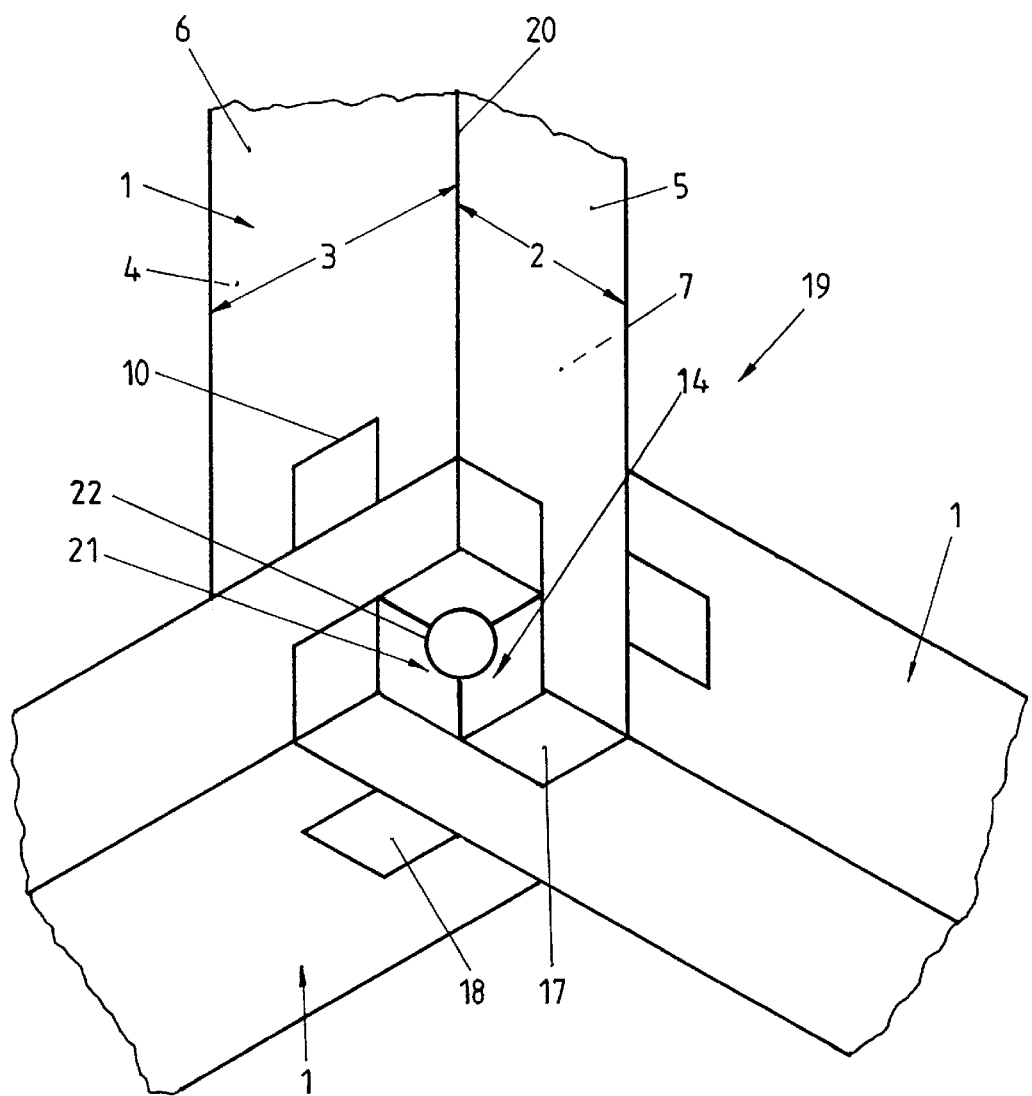
FIG. 4 shows a view of three rod-like elements of FIGS. 1 to 3 being connected in rectangular configuration to each other to form a corner of the piece of furniture and having a common bore.

The rod-like element 1 shown in FIGS. 1 to 3 preferably consists of hardwood and is a member of a piece of furniture. The element 1 has a rectangular cross section with a shorter edge 2 (FIG. 1) and a longer edge 3 (FIG. 2) determining the amount of the width of the shorter surfaces 4, 5 and the longer surfaces 6, 7, respectively. The shorter surfaces 4 and 5 extend parallel to each other. The longer surfaces 6, 7 also extend parallel to each other but in right angle arrangement with respect to the shorter surfaces 4, 5. The ratio of the width of the two kinds of surfaces is two to three. For example, the shorter edge 2 has a length of 4 cm, while the longer edge has a length of 6 cm. A special shape is provided on the one end of the rod-like element 1. This special shape extends along a region 8 in which three rod-like elements 1 penetrate each other forming a corner as illustrated in FIG. 4. This shape is formed by a slit 10 symmetrically arranged with respect to a middle plane 9 (FIG. 2). The depth 11 of the slit 10 is equal to the width of the longer edge 3. The width 12 of the slit 10 is a third part of the longer edge 3 and thus half the shorter edge 2. The slit 10 extends along the entire width as illustrated in FIG. 1. The slit 10 is arranged parallel with respect to the shorter surfaces 5. In addition, the rod-like element 1 has a cutout 14 arranged eccentrically with respect to a middle plane 13 (FIG. 1). The depth 15 of the cutout 14 is equal with the shorter edge 2 and corresponds with two thirds of the longer edge 3. The width 16 of the cutout 14 corresponds to half the length of the shorter edge 2. The cutout 14 superposes the slit 10. Thus, two times 17 and 18 of a fork are provided at the free end of the rod-like element 1. The tines 17 and 18 have the same shape and are arranged symmetrically with respect to the middle plane 9 but eccentrically with respect to the middle plane 13.

Three rod-like elements 1 identically shaped in their regions 8 can be connected to form a corner 19 of a piece of furniture as illustrated in FIG. 4. The three rod-like elements 1 extend along the three room directions perpendicular to each other. FIG. 4 shows a view from the outside of the corner 19 in the direction of the (one) common angle, i.e. with respect to the system of three axles suspended by the three rod-like elements 1. From FIG. 4, it can be taken that always the longer edge 3 is positioned left of the shorter edge 2. This arrangement can be called a left turning arrangement. Thus, the three rod-Eke elements 1 are connected in left turning arrangement. For purposes of clarity, reference numerals in FIG. 4 are shown only on the one rod-like element 1 penetrating the corner 19 from above. A hollow space 21 in form of a cube is arranged at the place at which the three outer rims 20 of the three rod-like elements 1 would intersect. The hollow cube-like space 21 has a length of its edge which corresponds with a third of the longer edge 3 or half the length of the shorter edge 2 respectively. The three rod-like elements are positioned 1 flush with all other three exterior surfaces of the joint except the hollow cube-like space 21. However, the three rod-like elements 1 shown in FIGS. 1 to 3 can be also connected in right turning arrangement to form a corner 19. A corner 19 of this right turning arrangement looks similar to the view of FIG. 4, built the longer edge 3 is always arranged right to the shorter edge 2. Composing or connecting the three rod-like elements 1 in a right turning arrangement, the same cube-like hollow space 21 appears at the intersection point of the outer rims 20.

FIG. 4 illustrates the three connected rod-like elements 1 in a view from the outside of the corner 19. A bore 22 is drilled in a direction corresponding to the (one) common angle. This direction is arranged perpendicular to the plane of the drawing of FIG. 4. The bore 22 extends through the tines 17 and 18 of all of the three rod-like elements 1. FIGS. 1 to 3 show the intersection lines 26 and 27 between the bore 22 and the tines 17 and 18. The intersection lines 26 and 27 of all of the three rod-like elements 1 performed by the bore 22 are identical with respect to every rod-like element 1, i.e. one bore 22 forms six intersection lines 26 and 27.

Figure 5:
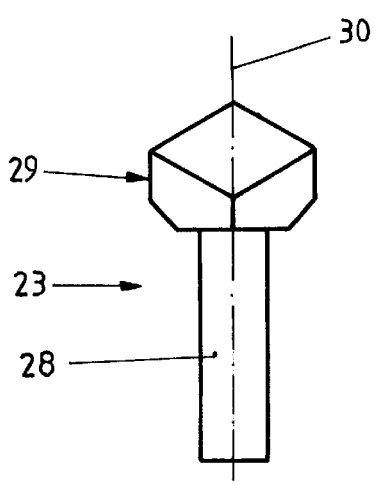
FIG. 5 is a side elevational view of a plug to be inserted into the bore shown in FIG. 4 from the outside of the corner.
Figure 6:
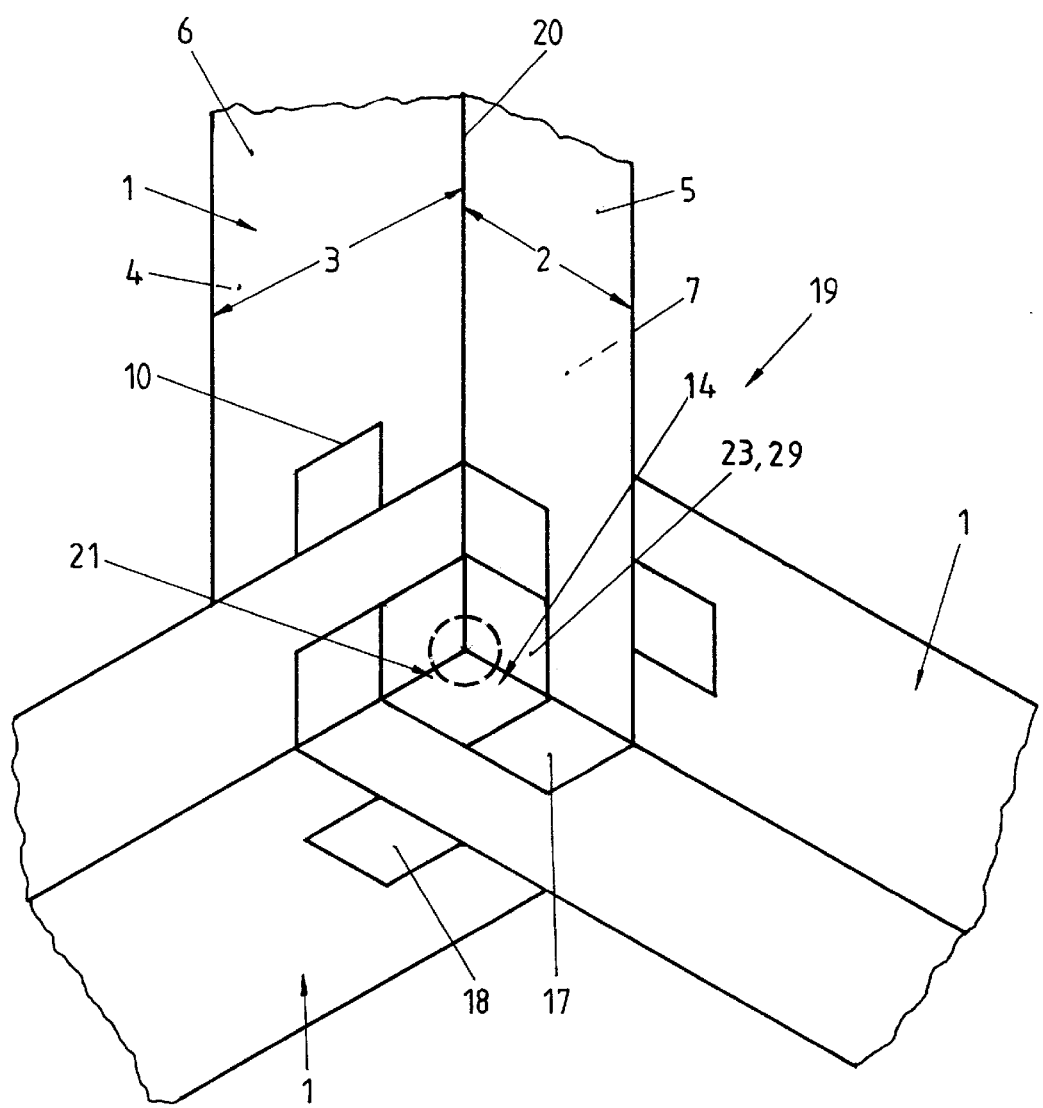
FIG. 6 is the view of FIG. 4 with the inserted plug of FIG. 5.

FIG. 5 illustrates a plug 23 having a cylindrical shaft 28 with a diameter corresponding to the diameter of the bore 22. The plug 23 comprises a head 29 having the same shape as the cube-like space 21 arranged on the outside of the corner 19. The head 29 with its surfaces fits to the surfaces on the space 21 and flush with the outer surfaces of the rod-like elements 1. The head 29 is a positive of the negative cube-like space 21. The plug 23 with its axis 30 is put in the bore 22 of the corner 19 s t hat its head 29 fills the space 21 of the connected three rod-like elements 1. This arrangement is shown in FIG. 6.

It is evident that the bore 22 may extend completely through the hardwood of the three rod-like elements 1. But it is also possible to apply the bore in form of a pocket hole. The plug 23 is a security element, i.e. the inserted plug 23 prevents puling-out of one of the connected rod-like elements 1 from the two others. Using a completely extending through plug 23 offers the possibility to force the inserted plug 23 from the inside of the corner 19 into the direction of the outside, i.e. to unlock the security element and to make dismounting of the three rod-like elements 1 possible. This is useful in connection with large piece of furniture for moving purposes. But it is also possible to use a bore 22 in form of a pocket hole and to insert an adapted plug together with glue avoiding the decomposing or dismounting possibility to create a piece of furniture having great stability. The drilling of the bore 22 in form of a pocket hole can start from the outside of the corner 19 or from the inside of the corner 19 extending to a certain depth in the three connected rod-like elements 1.

Figure 7:
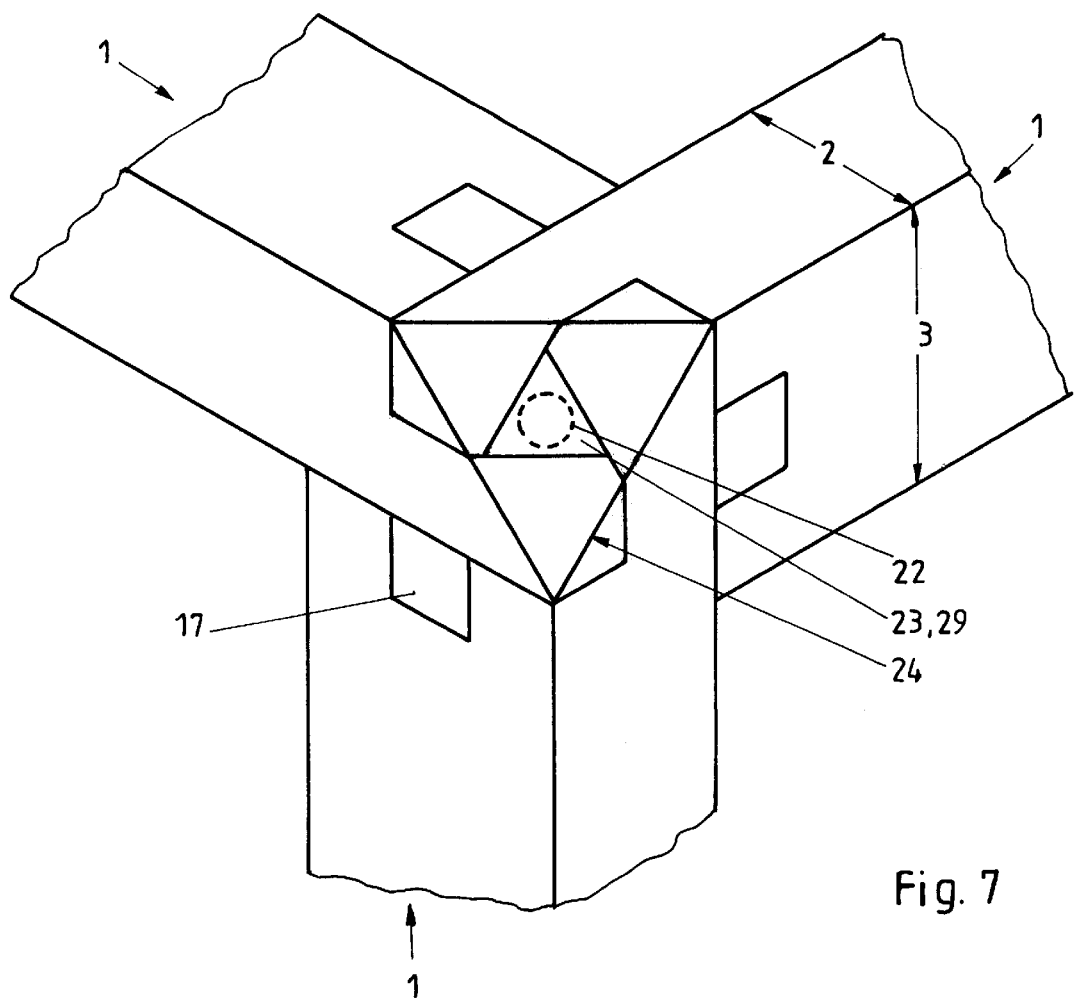
FIG. 7 shows a view of three rod-like elements of a second embodiment of the invention being connected in rectangular configuration to each other to form a corner of the piece of furniture and having a common bore.

FIG. 7 illustrates a further embodiment of three rod-like elements 1 connected to form a room corner. The rod-like elements 1 have the same features as described with reference to the embodiment of FIGS. 1 to 3. The time 17 has the same shape as in FIGS. 1 to 3. But the tine 18 has a flattening. The prolongation of the tine 18 has a further flattening. The flattenings are arranged in a plane and extend in an inclined angle of approximately 45° with respect to the exterior surface of the joint. The flattenings form a common surface 24 having a triangular shape and being arranged perpendicular to the (one) middle angle. A bore 22 is shown in dotted lines, and a plug 23 having a head 29 can be inserted as a security element as described above. The surface of the head 29 directed outwardly flushes with the surface 24.

Figure 8:
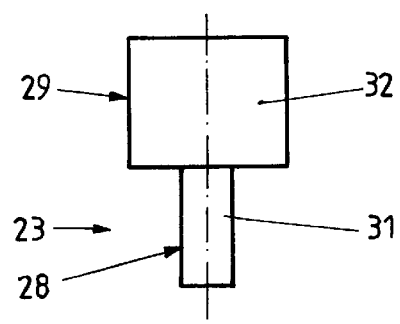
FIG. 8 is a side elevational view of a plug to be inserted into a stepped bore and having two cylindrical portions with different diameters.

FIG. 8 shows a plug 23 having a shaft 28 of a portion 31 with a small diameter and a head 29 of a portion 32 with a comparatively larger diameter. Preferably, the portion 32 forming the head 29 covers the cube-like space 21 (FIG. 4). It is evident that a stepped bore 22 is needed to insert the plug 23 having diameters corresponding to the diameters mentioned above. The stepped bore 22 is drilled after the composition of the three rod-like elements 1 to form a corner and the plug 23 of FIG. 8 is inserted into the stepped bore 22. The plug 23 may be made of a different kind of wood, a piece of wood differently colored, or the like. Using a non-stepped bore 22 or a bore having a reduced depth in its portion having the larger diameter, the head 29 can extend to the outside of the common surface 24 to form a decorative element. But it is also possible to grind the portion 32 of the plug 23 inserted into a stepped hole to have its surface flushing with the common surface 24. The filling of the space results in all of these possibilities.

Figure 9:
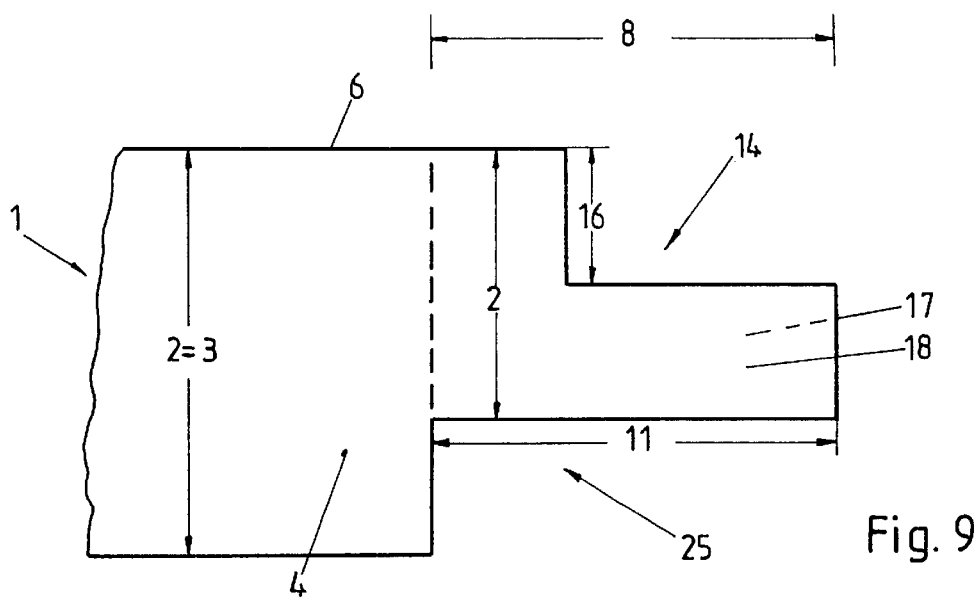
FIG. 9 is a side elevational view of a third embodiment of the invention, the rod-like element having a square cross section but the same shape of an end portion as the embodiment of FIGS. 1 to 3.
Figure 10:
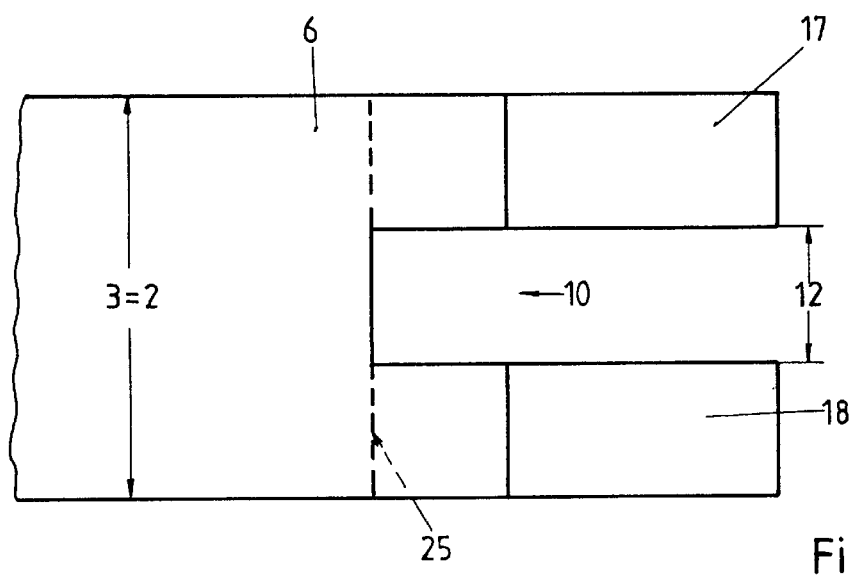
FIG. 10 is a top view of the third embodiment of the invention shown in FIG. 9.
Figure 11:
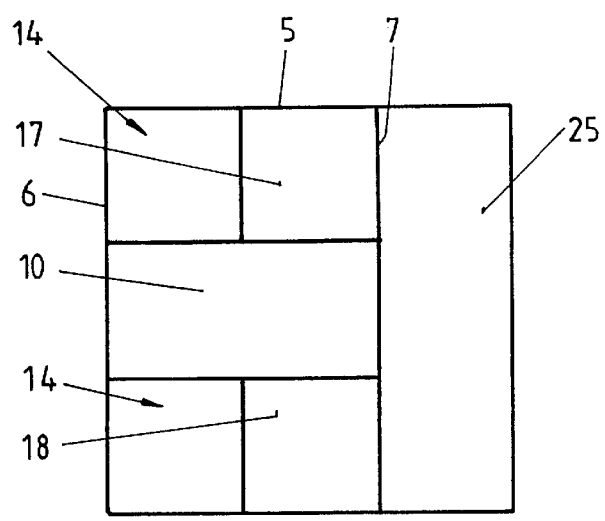
FIG. 11 is a side elevational view of the end of the third embodiment of the invention shown in FIGS. 9 and 10.

The rod-like element 1 of FIGS. 9 to 11 is the same as the one of the embodiment of FIGS. 1 to 4 as far as the region 8 is concerned. But the rod-like elements 1 have a square cross section. The composing of the three rod-like elements 1 is not prevented. In other words, starting from rod-like elements 1 having a square cross section, a cutout 25 is provided in the region 8 having the shape illustrated in FIGS. 9 to 11. Thus, in the region 8 a rectangular cross section having the ratio of two to three (2:3) is used as described with respect to the other embodiments. The intersection lines of the bore 22 are omitted for clarity.

Many variations and modifications may be made to the preferred embodiments of the invention without departing substantially from the spirit and principles of the invention. All such modifications and variations are intended to be included herein within the scope of the present invention, as defined by the following claims.

I claim:

1. A wooden piece of furniture, comprising:

at least three rod elements each having shorter edges, longer edges and an end portion of a rectangular cross section with a ratio of approximately two to three, the cross section being formed by said shorter edges and said longer edges;

slits having a depth and a width and being located in the end portion of each of said rod elements, said slits being arranged between and parallel to said shorter edges, the depth of said slits corresponding to said longer edges, and the width of said slits corresponding to one third of said longer edges;

cutouts having a depth and a width and being located in the end portion of each of said rod elements, said cutouts being arranged parallel to said longer edges, the depth of said cutouts corresponding to said shorter edges, and the width of said cutouts corresponding to half of said shorter edges;

extending tines each being formed by one of said slits and by one of said cutouts and being located in the end portion of each of said rod elements;

at least one corner to be formed by the end portions of said three rod elements being connectable to each other in a rectangular configuration;

at least one common bore having a diameter, said common bore at least partially extending through said three rod elements and being positioned at a common angle with respect to the rectangular configuration of said three rod elements, said common bore intersecting said tines of said three rod elements;

a hollow space being located in the connected end portions of the rectangular configuration of said three rod elements; and at least one plug to be inserted into said common bore to secure the rectangular configuration of said three rod elements, said plug including a head to be arranged thereon to fill said hollow space.

2. The piece of furniture of claim 1, wherein said plug has a diameter corresponding to the diameter of said common bore.

3. The piece of furniture of claim 1, wherein said common bore extends completely through said three rod elements.

4. The piece of furniture of claim 1, wherein said common bore is a pocket hole and extends partially through said three rod elements.

5. The piece of furniture of claim 1, wherein said common bore is a stepped bore having two different diameters, and said plug has a shaft, said head and said shaft of said plug having diameters corresponding to the diameters of said stepped bore.

6. The piece of furniture of claim 5, wherein said stepped bore is positioned to have its larger diameter on an outer side of the rectangular configuration of said three rod elements.

7. The piece of furniture of claim 5, wherein said stepped bore consists of a larger diameter that is is positioned an inner side of the rectangular configuration of said three rod elements.

8. The piece of furniture of claim 1, wherein the rectangular configuration of said three rod elements further includes a flattening forming a common plane surface of triangular shape.

9. The piece of furniture of claim 1, wherein the rectangular configuration of said three rod elements is connected in a left turning arrangement.

10. The piece of piece of furniture of claim 1, wherein the rectangular configuration of said three rod elements is connected in a right turning arrangement.

* * * * *